(12) United States Patent
Kim

(10) Patent No.: US 10,695,796 B2
(45) Date of Patent: Jun. 30, 2020

(54) METHOD FOR MANUFACTURING LONG FIBER REINFORCED COMPOSITE MATERIAL

(71) Applicant: LOTTE CHEMICAL CORPORATION, Seoul (KR)

(72) Inventor: Young-Bum Kim, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 87 days.

(21) Appl. No.: 15/396,876

(22) Filed: Jan. 3, 2017

(65) Prior Publication Data
US 2018/0001345 A1 Jan. 4, 2018

(30) Foreign Application Priority Data

Jul. 1, 2016 (KR) .................. 10-2016-0083485

(51) Int. Cl.
| | | |
|---|---|---|
| *B05D 7/20* | (2006.01) | |
| *B29B 15/12* | (2006.01) | |
| *B29C 70/00* | (2006.01) | |
| *B29C 70/50* | (2006.01) | |

(52) U.S. Cl.
CPC ............. *B05D 7/20* (2013.01); *B29B 15/125* (2013.01); *B29C 70/00* (2013.01); *B29C 70/50* (2013.01)

(58) Field of Classification Search
USPC ........................................................ 156/361
See application file for complete search history.

(56) References Cited

U.S. PATENT DOCUMENTS

| 4,439,387 | A | | 3/1984 | Hawley | |
|---|---|---|---|---|---|
| 4,549,920 | A | | 10/1985 | Cogswell | |
| 4,728,387 | A | | 3/1988 | Hilakos | |
| 4,946,538 | A | * | 8/1990 | Bendarzewski | ........ B29C 70/32 156/361 |

(Continued)

FOREIGN PATENT DOCUMENTS

| DE | 10-2012-013448 | | 5/2014 | | |
|---|---|---|---|---|---|
| DE | 102012013448 | * | 8/2014 | ............. | A61L 35/00 |

(Continued)

OTHER PUBLICATIONS

European Patent Office, European Search report of Application No. 17157724.0., dated May 9, 2017.

*Primary Examiner* — Dah-Wei D. Yuan
*Assistant Examiner* — Andrew J Bowman
(74) *Attorney, Agent, or Firm* — Lex IP Meister, PLLC

(57) ABSTRACT

A manufacturing method of a long fiber composite material according to an exemplary embodiment of the present invention includes: preparing a main body where inlets and outlets through which a plurality of fiber bundles are respectively charged into and discharged from are formed; adjusting a height of a plurality of first through-hole plates and a height of a second through-hole plate that are disposed in the main body to be the same; having the plurality of fiber bundles penetrated through the first through-hole plate and the second through-hole plate; and adjusting the height of the first through-hole plate and the height of the second through-hole plate to be different from each other after penetrating the plurality of fiber bundles through the first through-hole plate and the second through-hole plate.

11 Claims, 7 Drawing Sheets

(56) References Cited

U.S. PATENT DOCUMENTS

| | | |
|---|---|---|
| 5,133,282 A | 7/1992 | Bates |
| 5,540,797 A | 7/1996 | Wilson |
| 6,270,851 B1 | 8/2001 | Lee |
| 2014/0037842 A1 | 2/2014 | Tibor |

FOREIGN PATENT DOCUMENTS

| | | |
|---|---|---|
| JP | 2000-254978 | 9/2000 |
| JP | 2000-272021 | 10/2000 |
| JP | 2001-162689 | 6/2001 |
| JP | 2003-305779 | 10/2003 |
| JP | 3670906 | 7/2005 |
| JP | 2006-272868 | 10/2006 |
| JP | 2006-289714 | 10/2006 |
| JP | 2007-175959 | 7/2007 |
| JP | 4646108 | 3/2011 |
| KR | 10-1999-0009981 | 2/1999 |
| KR | 10-0203471 | 3/1999 |
| KR | 10-2000-0024343 | 5/2000 |
| KR | 10-0912734 | 8/2009 |
| KR | 10-1279328 | 6/2013 |
| WO | 01-81073 | 11/2001 |
| WO | 2016-147864 | 9/2016 |

* cited by examiner (A)

(B)

(A)

(B)

METHOD FOR MANUFACTURING LONG FIBER REINFORCED COMPOSITE MATERIAL

CROSS-REFERENCE TO RELATED APPLICATION

This application claims priority to and the benefit of Korean Patent Application No. 10-2016-0083485 filed in the Korean Intellectual Property Office on Jul. 1, 2016, the entire contents of which are incorporated herein by reference.

BACKGROUND OF THE INVENTION

(a) Field of the Invention

The present invention relates to a method for manufacturing a long fiber composite material.

(b) Description of the Related Art

In general, filaments constituting a continuous fiber bundle (specifically, including glass fiber and carbon fiber) are individually coated with a resin in order to improve mechanical strength, corrosion resistance, and fiber dispersibility.

A contact area between the filaments and the resin may be increased or the resin may be forcibly permeated between the filaments in the fiber bundle, i.e., between gaps of a fiber filament bundling body, so as to make thousands or tens of thousands of strands of fiber filaments constituting the fiber bundle wholly contact the resin. In this case, when the resin has low viscosity, the resin can be easily coated to the fiber filaments, but when the resin has high viscosity, the resin cannot be easily coated to each fiber filament.

Methods that have been widely used until now for coating continuous fiber bundles (i.e., a fiber filament bundling body) using a highly viscous resin include: a method in which cylinders or bar-shaped devices are provided in a zigzag manner in an impregnation tank filled with a resin, and when the fiber bundles move in a zigzag manner along the devices, the fiber bundles are controlled to be spread at the surface of the cylinder or the bar-shaped device so as to make the resin uniformly impregnated to the fiber bundles; and a method in which a plurality of donut-shaped rings are arranged in a fixed manner along a straight line in an impregnation tank and the fiber bundles are spread to the maximum while contacting an inner side and an outer side of the donut-shaped rings so as to widen a contact area between the resin and the filaments.

However, when the fiber filaments are continuously drawn to be shaped, intense tension is generated, thereby causing difficulty in manufacturing of a long fiber composite material at a high speed and imperfect coating of the resin, and thus a problem of poor dispersibility occurs in the fiber filaments in manufacturing of a final product, while the poor dispersibility of fiber filaments causes irregular occurrence of a plurality of pores in the finished product, which causes significant deterioration of mechanical and physical properties.

Further, the fiber bundles need to be arranged in a zigzag manner so as to apply tension to the fiber bundles, such arrangement is difficult, a work hazard exists as the process is performed in a high-temperature impregnation die, and a long period of time is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a manufacturing method of a long fiber composite material for uniformly impregnating a resin to surfaces of a plurality of filaments that form a fiber bundle.

In addition, the present invention provides a long fiber composite material manufacturing apparatus that can easily arrange fiber bundles in a zigzag shape in an impregnation die and reduce working time and work risk.

Further, the present invention provides a long fiber composite material manufacturing apparatus that can use various fiber filaments and various resins.

A manufacturing method of a long fiber composite material according to an exemplary embodiment of the present invention includes: preparing a main body where inlets and outlets through which a plurality of fiber bundles are respectively charged into and discharged from are formed; adjusting a height of a plurality of first through-hole plates and a height of a second through-hole plate that are disposed in the main body to be the same; having the plurality of fiber bundles penetrated through the first through-hole plate and the second through-hole plate; and adjusting the height of the first through-hole plate and the height of the second through-hole plate to be different from each other after penetrating the plurality of fiber bundles through the first through-hole plate and the second through-hole plate.

The manufacturing method of the log fiber composite material may further include, after the adjusting of the height of the first through-hole plate and the height of the second through-hole plate to be different from each other, moving the plurality of fiber bundles in a direction of the outlet from the inlet.

In the adjusting of the heights of the first and second through-hole plates, the plurality of fiber bundles that penetrate the first through-hole plate and the second through-hole plate may be adjusted to a straight line.

In the adjusting of the heights of the first and second through-hole plates, the second through-hole plate may be disposed at a height that is lower than that of the first through-hole plate.

In the adjusting of the heights of the first and second through-hole plates, the second through-hole plate may be disposed at a height that is higher than that of the first through-hole plate.

The plurality of first through-hole plates may be disposed in parallel with each other along a first direction in the main body, and a plurality of through holes through which the plurality of fiber bundles may be formed in the respective first through-hole plates.

The plurality of through-holes may have circular-shaped cross-sections.

The second through-hole plate may be disposed between every pair of first through-hole plates that are adjacent to each other among the plurality of first through-hole plates, and the plurality of fiber bundles penetrated through the first through-hole plate may penetrate the second through-hole plate.

A long hole through which the plurality of fiber bundles are penetrated may be provided in the second through-hole plate.

A plurality of protrusions may be formed in an inner wall of each long hole.

The plurality of protrusions may have curved shapes.

The long hole may be provided in plural.

The second through-hole plate may be provided in plural.

The second through-hole plate may be provided in plural.

According to the manufacturing method of the long fiber composite material of the exemplary embodiment of the present invention, the resin can be uniformly coated to the surfaces of the plurality of filaments that form the fiber bundles.

In addition, the fiber bundles can be injected in a straight line so that work can be easy and work time can be shortened.

In addition, tension of the fiber bundles can be controlled by adjusting the heights of the through-hole plates depending on a type of fiber filament and a type of resin.

Further, since the tension of the fiber bundles can be adjusted depending on the fiber filaments and the resin, thereby manufacturing various grades of products.

DETAILED DESCRIPTION OF THE EMBODIMENTS

Figure 1:
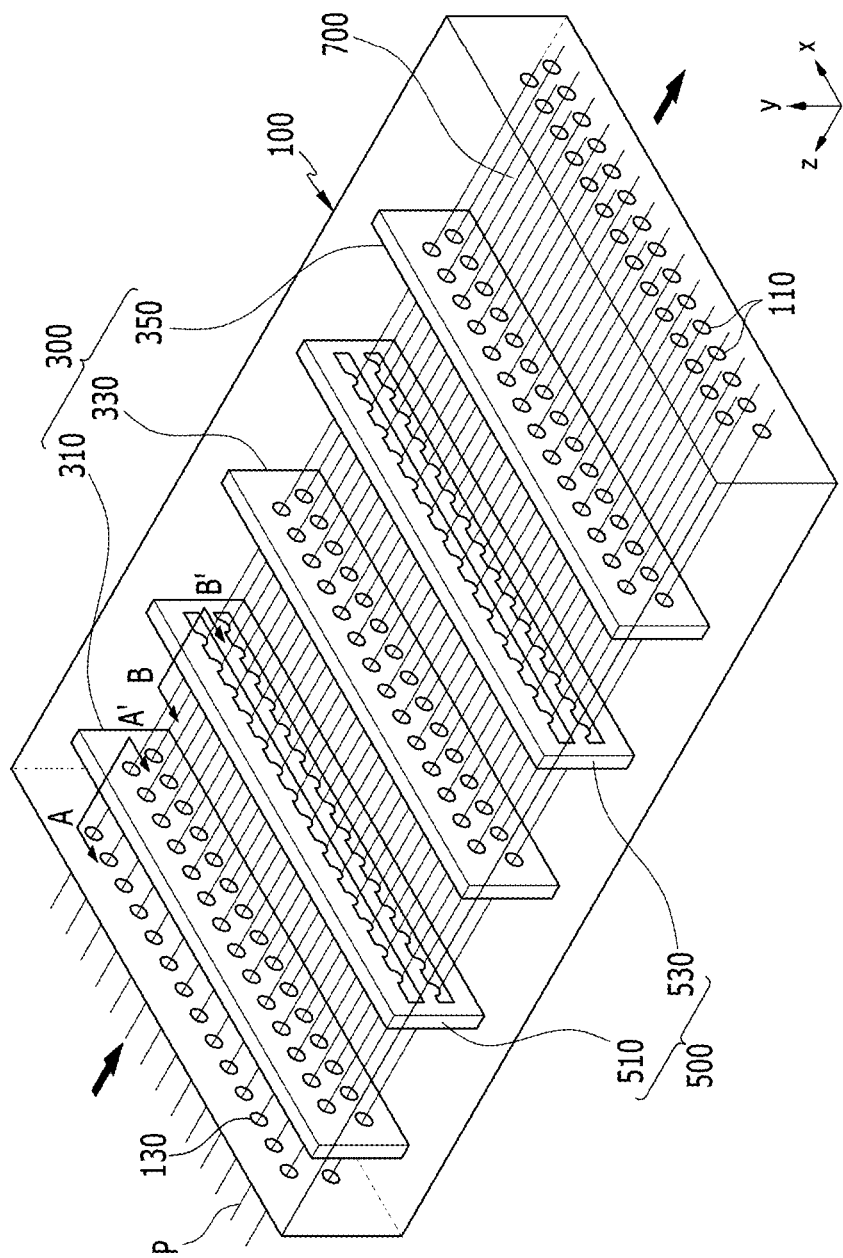
FIG. 1 is a perspective view of a part of an apparatus for manufacturing a long fiber composite material according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the present invention is not limited thereto.

In addition, unless explicitly described to the contrary, the word "comprise" and variations such as "comprises" or "comprising" will be understood to imply the inclusion of stated elements but not the exclusion of any other elements. Throughout the specification, the word "on" means positioning on or below the object portion, but does not essentially mean positioning on the upper side of the object portion based on a gravitational direction.

Hereinafter, FIG. 1 to referring to FIG. 7, a method for manufacturing long fiber composite material according to an exemplary embodiment of the present invention will be described.

Figure 2:
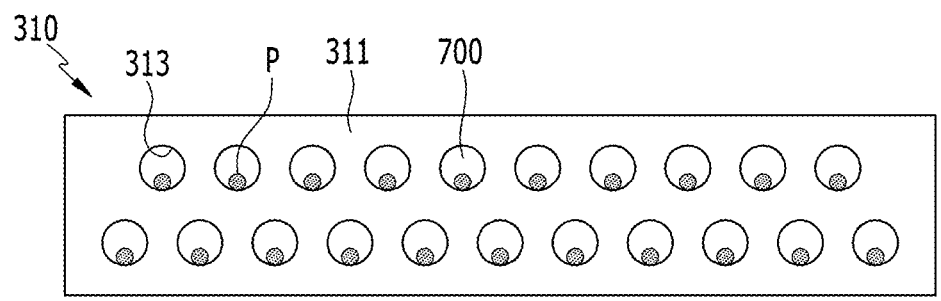
FIG. 2 is a front view of a first through-hole plate.
Figure 2:
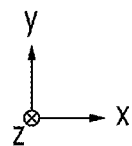
Figure 3:
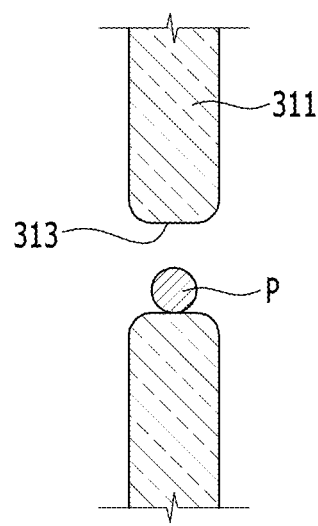
FIG. 3 is a cross-sectional view of FIG. 1, taken along the line A-A'.
Figure 4:
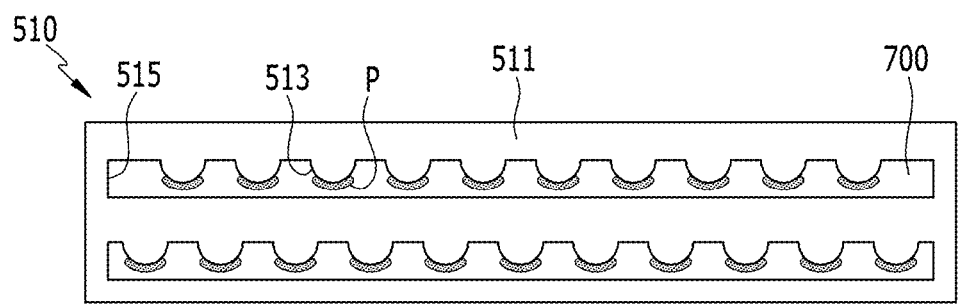
FIG. 4 is a front view of a second through-hole plate.
Figure 4:
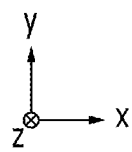
Figure 5:
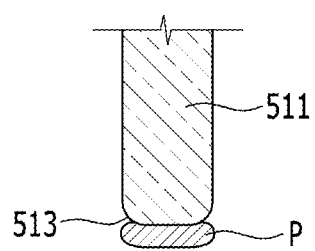
FIG. 5 is a cross-sectional view of FIG. 1, taken along the line B-B'.
Figure 5:
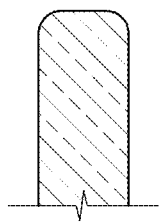
Figure 6:
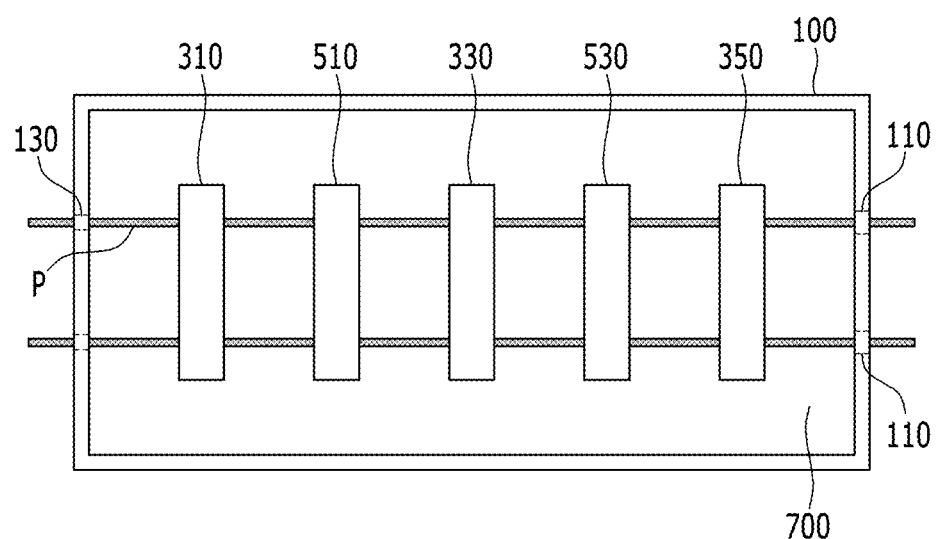
FIG. 6 and FIG. 7 are views provided for description of operation of the manufacturing apparatus used for manufacturing the long fiber composite material.

FIG. 1 is a perspective view of a part of a manufacturing apparatus used for manufacturing a long fiber composite material according to an exemplary embodiment of the present invention, FIG. 2 is a front view of a first through-hole plate, and FIG. 3 is a cross-sectional view of FIG. 1, taken along the line A-A'. FIG. 4 is a front view of a second through-hole plate, FIG. 5 is a cross-sectional view of FIG. 1, taken along the line B-B', and FIG. 6 and FIG. 7 are views provided for description of operation of the manufacturing apparatus used for manufacturing the long fiber composite material.

First, according to the method for manufacturing the long fiber composite material of the present exemplary embodiment, a manufacturing apparatus of the long fiber composite material, including a main body 100, a first through-hole plate 300, and a second through-hole plate 500, is prepared. In the present exemplary embodiment, the long fiber composite material can be manufactured by using the long fiber composite material manufacturing apparatus that includes the main body 100, the first through-hole plate 300, and the second through-hole plate 500. In the present exemplary embodiment, the first through-hole plate 300 and the second through-hole plate 500 through which a plurality of bundles of fiber P penetrate are disposed at different heights, and thus a resin 700 can be uniformly impregnated to the plurality of bundles of fiber P that spread in a width direction (i.e., x-axis direction in the drawing).

Before describing the manufacturing method according to the present exemplary embodiment, the manufacturing apparatus used in the present exemplary embodiment will be described in detail.

Referring to FIG. 1, the manufacturing apparatus used in the present exemplary embodiment may include the main body 100, the first through-hole plate 300, and the second through-hole plate 500.

The main body 100 is a die for impregnation or an impregnation tank where a space is formed therein, and the first through-hole plate 300 and the second through-hole plate 500 may be disposed in the space. In addition, a resin having high or low viscosity and impregnated to the bundle of fiber may be stored in the space.

In this case, an inlet hole 130 through which the plurality of bundles of fiber P are inserted to the space in the main body 100 may be provided in one side of the main body 100. The inlet hole 130 is provided in plural, and each of the bundles of fiber P may be injected through an inlet hole 130. Alternatively, the inlet hole 130 may be provided as a single opening through which the plurality of bundles of fiber P may be injected all together through the inlet hole 130.

In addition, an outlet hole 110 through which the plurality of bundles of fiber P are discharged may be provided in the other side of the main body 100. That is, the plurality of bundles of fiber P are injected to the main body 100 through the inlet hole 130 of the main body 100, impregnated with the resin 700, and then discharged through the outlet hole 110.

In this case, the outlet hole 110 may be formed corresponding to the plurality of inlet holes 130. That is, the number of outlet holes 110 and the number of inlet holes 130 may be the same. For example, each of the plurality of bundles of fiber P may be injected through an inlet hole 130 and then discharged through an outlet hole 110 that corresponds to the inlet hole 130.

According to the present exemplary embodiment, a plurality of first through-hole plates 300 may be disposed in the space of the main body 100. The plurality of bundles of fiber P injected into the space through the inlet hole 130 may penetrate through the plurality of first through-hole plates 300.

In this case, the plurality of first through-hole plates 300 may be disposed in parallel with each other along a first direction (i.e., Z-axis direction in the drawing). That is, the plurality of first through-hole plates 300 are disposed in parallel with the first direction, which is a progress direction of the plurality of bundles of fiber P. In the following description, the plurality of first through-hole plates 300 include three first through-hole plates 310, 330, and 350. However, this is not restrictive, and the plurality of first through-hole plates 300 may include two or more first through-hole plates.

The plurality of first through-holes 310, 330, and 350 may be apart from each other by a predetermined gap along the first direction. In the present exemplary embodiment, the gap between each of the plurality of first through-hole plates 310, 330, and 350 can be adjusted. The gap can be adjusted according to a type of the bundle of fiber P or a type of the resin 700 to be impregnated.

Referring to FIG. 2 and FIG. 3, a plurality of through-holes 313 may be provided in each of the plurality of first through-hole plates 310, 330, and 350. The plurality of through-holes 313 are provided in a first body 311 of each of the first through-hole plates 310, 330, and 350. The plurality of through-holes 313 may be disposed apart from each other with a constant gap along a third direction (i.e., X-axis direction) that is perpendicular to the first direction. In the present exemplary embodiment, the plurality of through-holes 313 may be arranged in two lines along the third direction. However, this is not restrictive, and the plurality of through-holes 313 may be arranged in one line or three or more lines.

Each of the plurality of bundles of fiber P may penetrate each of the plurality of through-holes 313. For example, one fiber bundle P may penetrate one through-hole 313. However, this is not restrictive, and two or more fiber bundles P may penetrate one through-hole 313. In the present exemplary embodiment, one fiber bundle P among the plurality of fiber bundles P may be formed of thousands or tens of thousands of strands of filaments.

In this case, inner sides of the plurality of through-holes 313 of the first body 313 may be curved. As shown in FIG. 3, since the inner sides of the through-holes 313, which contact the plurality of fiber bundles P, are curved, the plurality of fiber bundles P can be easily penetrated through the through-holes 313.

Referring to FIG. 1 and FIG. 4, the second through-hole plate 500 may be provided in plural. In the present exemplary embodiment, second through-hole plates 510 and 530 may be disposed between the plurality of first through-hole plates 310, 330, and 350. More specifically, one second through-hole plate may be disposed between a pair of first through-hole plates that are adjacent to each other among the plurality of first through-hole plates 310, 330, and 350. In the present exemplary embodiment, the second through-hole plate 510 may be disposed between the first through-hole plates 310 and 330, and the second through-hole plate 530 may be disposed between the first through-hole plates 330 and 350.

In the present exemplary embodiment, the plurality of fiber bundles P that penetrate the first through-hole plate 310 penetrate the second through-hole plate 510. In addition, the plurality of fiber bundles P penetrated through the second through-hole plate 510 may penetrate the first through-hole plate 330. Alternatively, the plurality of fiber bundles P penetrated through the first through-hole plate 330 may penetrate the second through-hole plate 530. Then, the plurality of fiber bundles P penetrated through the second through-hole plate 530 may penetrate the first through-hole plate 350.

Meanwhile, long holes 515 may be provided in the plurality of second through-hole plates 510 and 530. Referring to FIG. 4, the long hole 515 may be provided in a second body 511 of the second through-hole plate 510 and is opened along the third direction. Similar to the first through-hole plates 310, 330, and 350, the long holes 515 may be arranged in two lines along the third direction. However, this is not restrictive, and the long holes 515 may be arranged in one or three or more lines.

A plurality of protrusions 513 may be provided in each long hole 515. The plurality of protrusions 513 may be provided in an inner wall of the long hole 515. In this case, the plurality of protrusion 513 may be convex toward the ground. In the present exemplary embodiment, the number of protrusions 513 may correspond to the number of through-holes 313 provided in the plurality of first through-hole plates 310, 330, and 350. For example, the number of protrusions 513 formed in the long hole 515 may be the same as the number of through-holes 313 shown in FIG. 2. Alternatively, the number of protrusions 513 may be greater than the number of through-holes 313.

Each of the plurality of protrusions 513 may have a curved shape. For example, the plurality of protrusions 513 may have a shape of a semi-circle or a half oval, or may have a partially curved shape.

The plurality of protrusions 513 of the second main body 511 are curved along the first direction. As shown in FIG. 5, a plurality of protrusions 513 that contact the plurality of fiber bundles P have curved external surfaces so that the plurality of fiber bundles P can easily penetrate the protrusions 513.

Referring back to FIG. 1, the second through-hole plates 510 and 530 that are disposed between the plurality of first through-hole plates 310, 330, and 350 may move in a second direction (i.e., Y-axis direction in the drawing) that is perpendicular to the first direction and the second direction. For example, the second through-hole plates 510 and 530 may vertically move along the second direction. According to the present exemplary embodiment, tension applied to the plurality of fiber bundles P that penetrate the second through-hole plates 510 and 530 can be adjusted by vertically moving the second through-hole plates 510 and 530 along the second direction.

In the present exemplary embodiment, when the above-described manufacturing apparatus is prepared, the first through-hole plate 300 and the second through-hole plate 500 are placed at the same height. Here, the term "the same height" implies that the plurality of through-holes 313 of the first through-hole plate 300 and the long holes 515 of the second through-hole plate 500 have the same height. More specifically, the first through-hole plate 300 and the second through-hole plate 500 are controlled to ensure that the plurality of through-holes 313 of the first through-hole plate 300 and the long holes 515 of the second through-hole plate 500 are straight.

Next, the plurality of fiber bundles P penetrate the first through-hole plate 300 and the second through-hole plate 500 that are disposed at the same height. More specifically, the plurality of fiber bundles P sequentially penetrate the plurality of through-holes 313 of the first through-hole plate 300 and the long holes 515 of the second through-hole plate 500.

Referring to FIG. 6, the plurality of fiber bundles P are sequentially penetrated in order of the first through-hole plate 310, the second through-hole plate 510, the first through-hole plate 330, the second through-hole plate 530, and the first through-hole plate 350. As described above, in this case, the plurality of fiber bundles P form a straight line. That is, the plurality of fiber bundles P do not bent while penetrating the first through-hole plate 300 and the second through-hole plate 500.

Figure 7:
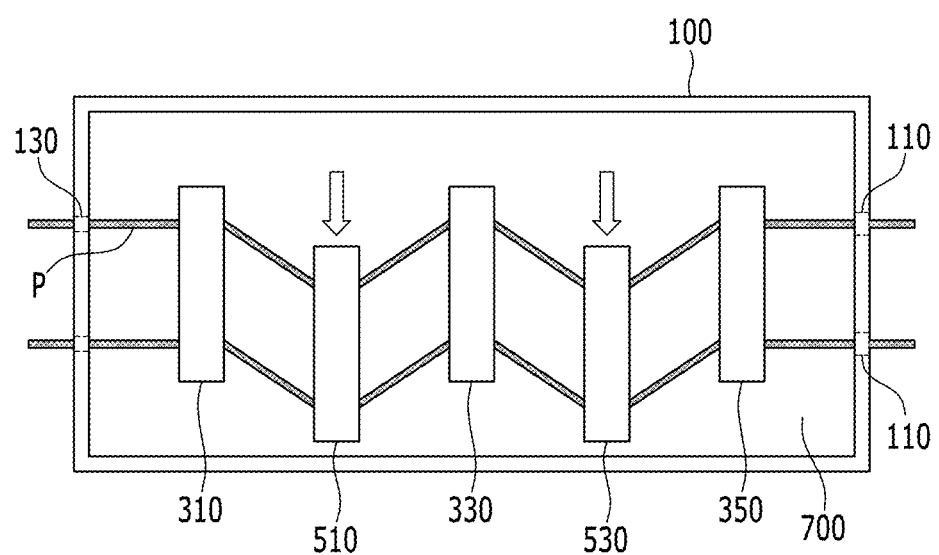

Next, as shown in FIG. 7, the second through-hole plates 510 and 530 are moved down along the second direction. In FIG. 7, the second through-hole plates 510 and 530 are moved down, but this is not restrictive. The second through-hole plates 510 and 530 may be moved upward.

When the second through-hole plates 510 and 530 are moved down, tension may be applied to the plurality of fiber bundles P that penetrate the second through-hole plates 510 and 530. When the tension is applied to the plurality of fiber bundles P, a cross-sectional shape of the fiber bundle P that penetrate the hole holes 515 of the second through-hole plates 510 and 530 may be deformed.

Figure 8:
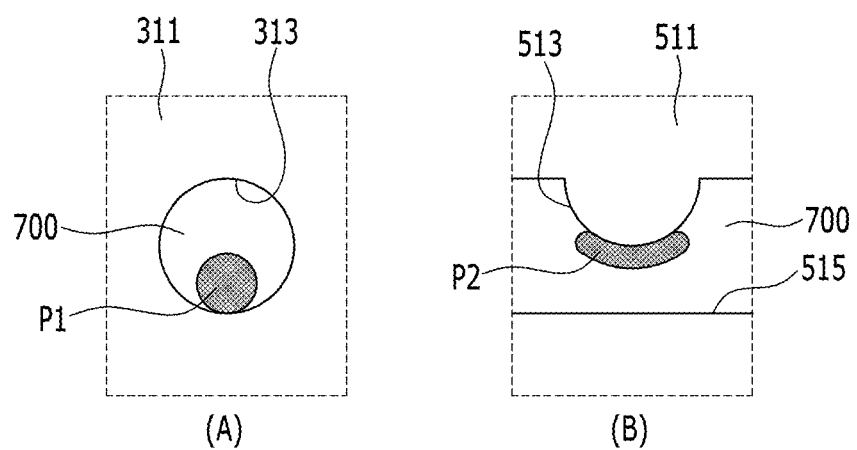
FIG. 8 shows a cross-sectional shape of the fiber bundle in the first through-hole plate and the second through-hole plate.

FIG. 8 shows a cross-sectional shape of the fiber bundle in the first through-hole plates 310, 330, and 350 and the second through-hole plates 510 and 530 of FIG. 7.

Referring to FIG. 8 (A), a shape of a cross-section of fiber bundle P1 that penetrates the first through-hole plate 310 is close to circular. On the contrary, referring to FIG. 8 (B), a shape of a cross-section of fiber bundle P2 that penetrates the second through-hole plate 510 is deformed to be unlike the cross-section of FIG. 8 (A).

Specifically, the fiber bundle P2 penetrating the second through-hole plate 510 is applied with tension, and thus the fiber bundles P are deformed by the protrusions 513 that are in contact with the fiber bundles P2. For example, as shown in FIG. 8 (B), the fiber bundles P2 may be flattened and spread.

As described above, one fiber bundle P1 may be formed of thousands or tens of thousands of strands of fiber filaments. Thus, when the cross-section of the fiber bundle P2 is deformed as described above in the long hole 515 of the second through-hole plate 510, gaps between thousands of strands of fiber filaments that form the fiber bundle P may be increased. As described, when the gaps between the fiber filaments are increased, pores occur between the fiber filaments such that the resin 700 may be permeated between the pores. Accordingly, the resin 700 can be easily coated to surfaces of the fiber filaments that form the fiber bundle P2.

In addition, in the present exemplary embodiment, the plurality of fiber bundles P penetrated through the second through-hole plate 510 penetrate the first through-hole plate 330 again. In this case, the shapes of the plurality of fiber bundles P penetrated through the first through-hole plate 330 recover shapes that are close to circles. Then, the pores between the fiber filaments that form the plurality of fiber bundles P are reduced.

Next, when the plurality of fiber bundles P penetrate the second through-hole plates 520 again, the pores between the fiber filaments that form the plurality of fiber bundles P are increased. When the plurality of fiber bundles P penetrate the first through-hole plate 350, the pores between the fiber filaments that form the plurality of fiber bundles P are decreased.

As described, according to the present exemplary embodiment, when the plurality of fiber bundles P iteratively penetrate the first through-hole plates 310, 330, and 350 and the second through-hole plates 510 and 530, the pores between the fiber filaments of the plurality of fiber bundles P are iteratively increased and decreased. Thus, that the resin 700 can be uniformly impregnated to the fiber bundles P.

In the present exemplary embodiment, the plurality of fiber bundles P are continuously injected to the main body 100 so as to continuously manufacture a long fiber composite material. That is, the plurality of fiber bundles P are moved in a direction of the outlet hole 110 from the inject hole 130 of the main body 100. The plurality of fiber bundles P are impregnated to the resin 700 and then discharged while passing through the main body 100.

Figure 9:
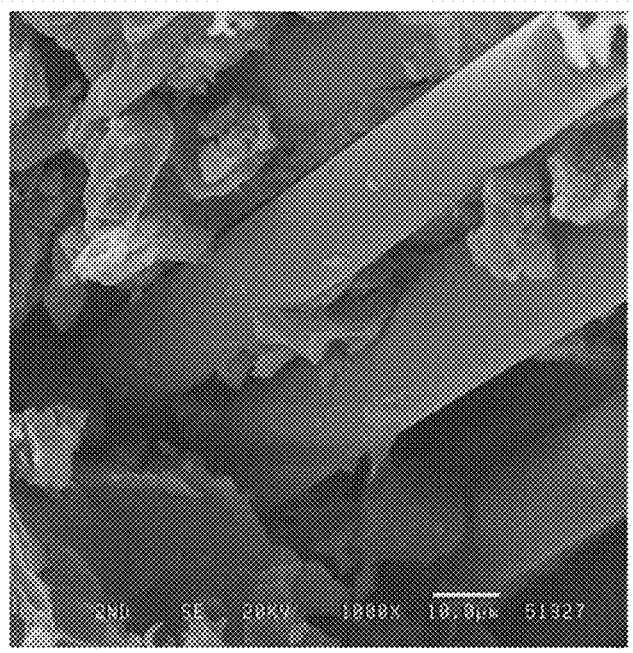
FIG. 9 is a photograph of an enlarged surface of long fiber composite materials manufactured by the present exemplary embodiment and a comparative example.
Figure 9:
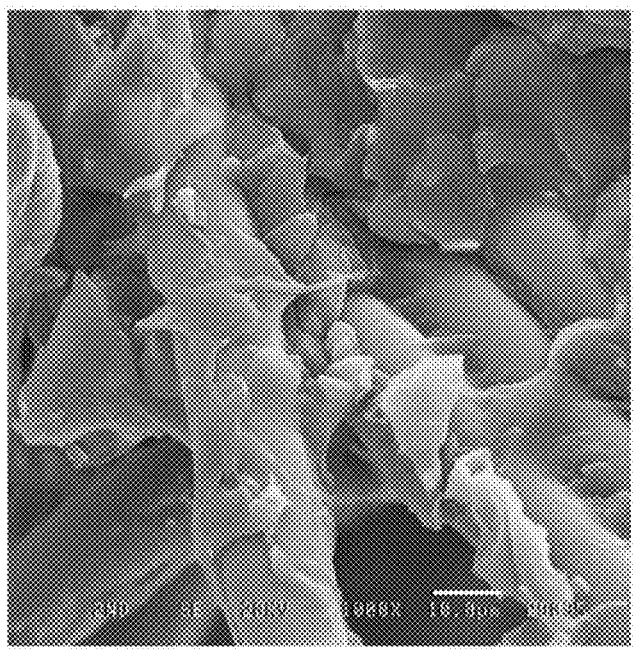
Figure 10:
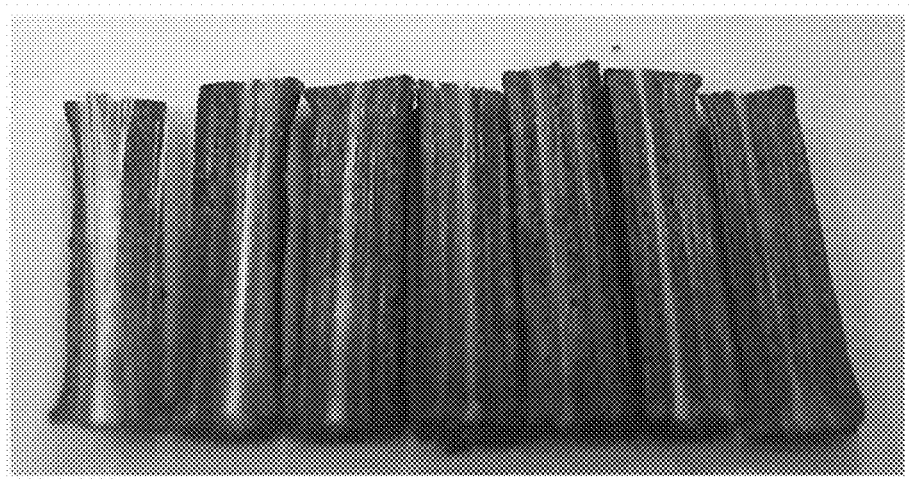
FIG. 10 is a photograph of the long fiber composite material cuts manufactured by the present exemplary embodiment and the comparative example.
Figure 10:
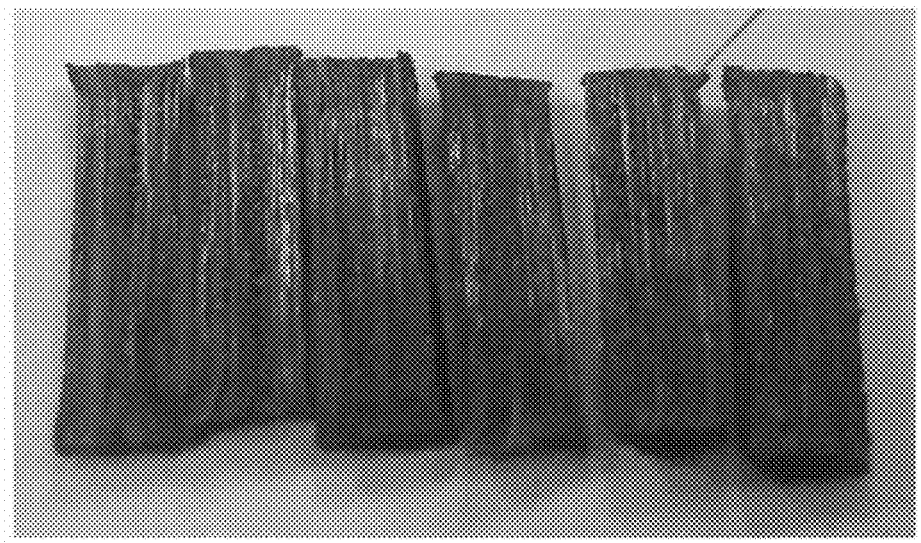

Referring to FIG. 9 and FIG. 10, it can be observed that the resin 700 is uniformly impregnated to fiber bundles P of the long fiber composite material manufactured by using the manufacturing method of the long fiber composite material according to the present exemplary embodiment.

FIG. 9 is a photograph of an enlarged surface of long fiber composite materials manufactured by the present exemplary embodiment and a comparative example, and FIG. 10 is a photograph of long fiber composite material cuts manufactured by the present exemplary embodiment and the comparative example.

In FIG. 9 and FIG. 10, the resin 700 coated to the fiber bundles P according to the manufacturing method of the present exemplary embodiment (B) includes a polypropylene resin, a black pigment, an antioxidant, and the like. As the fiber bundle P, glass fiber is used. An internal temperature of the main body 100 is 200° C. to 300° C., and a moving speed of the plurality of fiber bundles P that penetrate the main body 100 is 300 m/min.

Meanwhile, according to a manufacturing method of the comparative example (B) of FIG. 9 and FIG. 10, unlike the present exemplary embodiment, the above-stated material or temperature is the same, but plates through which the fiber bundles P are penetrated maintain the same height.

When the long fiber composite materials that are manufactured by the comparative example of FIG. 9 (A) and the exemplary embodiment of FIG. 9 (B) are observed with an optical microscope or an electron microscope, it can be observed than the resin 700 is more uniformly coated to the surfaces of the filaments of the fiber bundles P of the exemplary embodiment of FIG. 9 (B) compared to the comparative example of FIG. 9 (A).

In addition, referring to FIG. 10, compared to the comparative example of FIG. 10 (A), the resin 700 is uniformly coated to the long fiber composite material of the present exemplary embodiment of FIG. 10 (B). FIG. 10 shows long fiber composite material cuts, and an area where the resin 700 is not coated is the long fiber composite material (i.e., an area where white fiber bundle exists in the left side of FIG. 10 (A)) is shown in FIG. 10 (A).

According to the manufacturing method of the long fiber composite material of the exemplary embodiment of the present invention, the plurality of fiber bundles P that penetrate the main body 100 iteratively penetrate the first through-hole plates 310, 330, and 350 and the second through-hole plates 510 and 530, and thus the pores between the fiber filaments of the plurality of fiber bundles P are iteratively increased and decreased. Accordingly, the fiber bundles P can be uniformly impregnated by the resin 700.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 100 main body
110 outlet
130 inlet
300, 310, 330, 350 first through-hole plate
313 through-holes
500, 510, 530 second through-hole plate
513 protrusions
515 long hole

What is claimed is:

1. A manufacturing method of a fiber composite material, comprising:
    preparing a main body where inlets and outlets through which a plurality of fiber bundles are respectively charged into and discharged from are formed;
    adjusting a height of a plurality of first through-hole plates and a height of a second through-hole plate that are disposed in the main body to be the same;
    having the plurality of fiber bundles penetrated through the first through-hole plate and the second through-hole plate; and
    adjusting the height of the plurality of first through-hole plates and the height of the second through-hole plate to be different from each other after the plurality of fiber bundles penetrate through the plurality of first through-hole plates and the second through-hole plate,
    wherein a second hole through which the plurality of fiber bundles are penetrated is provided in the second through-hole plate, and has a predetermined length, and
    wherein a plurality of protrusions are formed only in an inner wall of the second hole, and arranged along a length direction of the second hole,
    wherein the second through-hole plate is disposed between a pair of first through-hole plates that are adjacent to each other among the plurality of first through-hole plates.

2. The manufacturing method of the fiber composite material of claim 1, after the adjusting of the height of the first through-hole plate and the height of the second through-hole plate to be different from each other, further comprising moving the plurality of fiber bundles in a direction of the outlet from the inlet.

3. The manufacturing method of the fiber composite material of claim 1, wherein in the adjusting of the heights of the first and second through-hole plates, the plurality of fiber bundles that penetrate the first through-hole plate and the second through-hole plate are adjusted to a straight line.

4. The manufacturing method of the fiber composite material of claim 1, wherein, in the adjusting of the heights of the first and second through-hole plates, the second through-hole plate is disposed at a height that is lower than that of the first through-hole plate.

5. The manufacturing method of the fiber composite material of claim 1, wherein, in the adjusting of the heights of the first and second through-hole plates, the second through-hole plate is disposed at a height that is higher than that of the first through-hole plate.

6. The manufacturing method of the fiber composite material of claim 1, wherein the plurality of first through-hole plates are disposed in parallel with each other along a first direction in the main body, and a plurality of first holes through which the plurality of fiber bundles are formed in the respective first through-hole plates.

7. The manufacturing method of the fiber composite material of claim 6, wherein the plurality of first holes have circular-shaped cross-sections.

8. The manufacturing method of the fiber composite material of claim 6, wherein the plurality of fiber bundles penetrated through the first through-hole plate penetrate the second through-hole plate.

9. The manufacturing method of the fiber composite material of claim 1, wherein the plurality of protrusions have curved shapes.

10. The manufacturing method of the fiber composite material of claim 1, wherein the second hole is provided in plural.

11. The manufacturing method of the fiber composite material of claim 1, wherein the second through-hole plate is provided in plural.

* * * * *